Sept. 26, 1944.  G. ZOTOS  2,358,903
METHOD OF MELTING REFRACTORY MINERALS IN REVOLVING-TUBE FURNACES
Filed Dec. 1, 1936
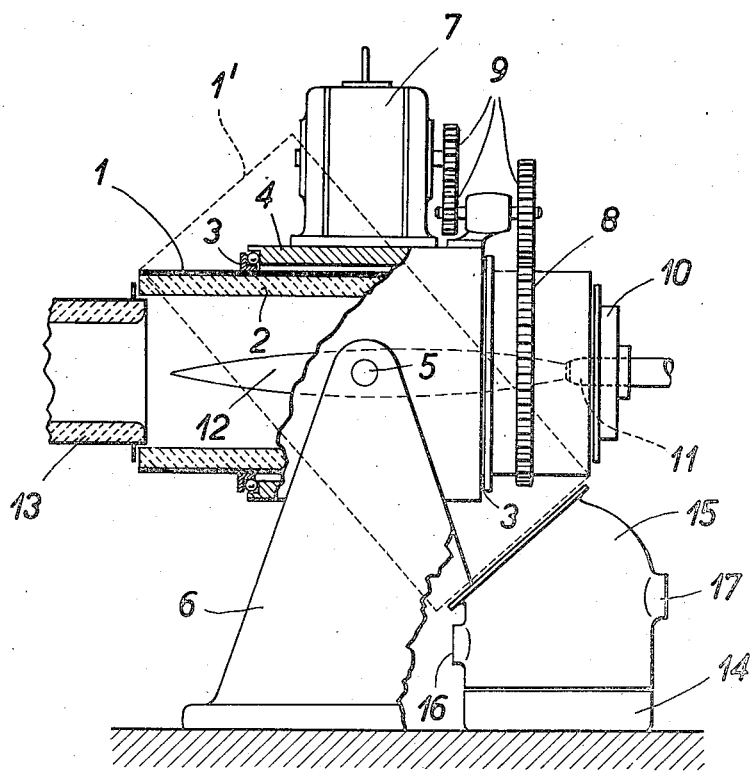
Inventor:

Patented Sept. 26, 1944

2,358,903

UNITED STATES PATENT OFFICE 2,358,903

METHOD OF MELTING REFRACTORY MINERALS IN REVOLVING-TUBE FURNACES

Georg Zotos, Berlin-Charlottenburg, Germany; vested in the Alien Property Custodian Application December 1, 1936, Serial No. 113,559½
In Germany December 4, 1935

1 Claim. (Cl. 49—77)

The invention concerns a method of melting glass silicates, other substances that are plastic when heated, and refractory minerals, especially oxides, by means of a revolving-tube furnace the drum of which rotates so quickly about its longitudinal axis that the charge to be melted is spread approximately uniformly on the interior surface of the drum. In the known devices of this kind, the said drum is horizontal or slightly inclined, and one of the drum ends has a burner the heating flame of which flashes into the rotating drum in such a way as to impinge on the charge on the interior drum surface. By impinging on the charge, the flame gives, however, rise to turbulent currents and whirls in the drum, which develop dust and thus retard the process of melting the charge.

The said disadvantage is overcome by the invention, according to which the heating flame is so directed into the melting chamber that whirls are avoided and the heat of the flame is transmitted to the charge by radiation only. This novel proceeding shows better results particularly in the treatment of refractory oxides of the kind used for making special technical objects, for instance quartz glass, sintered corundum, etc. Using the heat-technical preheating methods known per se and, particularly, supplying liquefied air or oxygen to the source of heat is especially advantageous. It is surprising that using oxygen and guiding the flame centrally yields much better results than making an oxygen flame impinge on the material to be melted, as has been done so far, this improvement being due, especially in quartz melting to a decrease of the very disturbing evaporation of the said material. To obtain an effective radiation of the very hot flame produced, so that a transmission of intense heat can take place without the flame impinging on the charge, it may be convenient to increase the radiation capacity of the flame by adding to this flame a body not impairing the melting process, for instance fine charge dust, the exceedingly high temperatures thus available entailing the desired rapid and uniform physical and physico-chemical transformations.

In melting quartz, it is especially expedient to considerably increase the speed of rotation in such a manner that the radial centrifugal pressure increases artificially the pressure on the melting or pasty content of the drum. The idea underlying the said increase in pressure, to which not only the superficial but also the lower layers are subject, is to counteract the evaporation in a technical simple manner without the necessity of augmenting the gas pressure in the combustion chamber, which is exceedingly practical and constitutes considerable technical progress in quartz technology. This new proceeding naturally increases considerably the tensile strain sustained by the drum, which, nevertheless, can be remedied without difficulty, because the strain concerned remains within the limits admissible for the construction material concerned, for instance steel plate.

The method is carried into practice, as usual, by introducing the charge into the drum continuously or by steps and transforming this charge to a homogeneous batch. The molten batch is not permitted to flow out slowly but made to leave the drum very quickly at one and the same time. This proceeding is especially favourable in the case of refractory material, since it avoids losses due to the cooling of a comparatively thin jet of molten material leaving the drum and thus prevents the material from solidifying before the subsequent forming process takes place. The molten, and very hot, material is transferred very quickly from the furnace into a stationary receiver, in which it is kept at a high temperature. The molten material is formed in this receiver in the usual manner, for instance by blowing, pressing etc., eventually at the said temperature or at a temperature above that of the surroundings. The latter proceeding permits a better treatment and prevents undesired losses of heat. Oxides of the purest kind, which are known to have very narrow limits of softening, can, accordingly, be melted and treated comparatively easily and economically. It is especially economic to at least pre-form the molten material in the said manner and to continue forming it in a chamber less intensely heated.

A plant having a revolving-tube furnace for carrying the method into practice has, conveniently, a burner which can be fed according to circumstances with suitable gas, oil and other combustibles and which is so positioned that the heating flame is directed into the drum centrally and axially. Also electric heating can be used, but it is to be considered that heat produced by combustion for "thermal heat" is cheaper. Respecting the feeding and directing of the flame and the form of the burner it has to be borne in mind in the case of the method in question that turbulent currents and whirls are to be avoided as much as possible in order to prevent creation of disturbing dust. On account of the high speed of revolution of the drum, it is advisable to protect the drum by means of an armour resisting high internal pressures. The apparatus is considerably improved by a device for discharging the drum completely at one and the same time, for instance a tipping mechanism by means of which a drum cover and burner and a heated receiver for the molten material can be connected to the drum alternatively. The receiver conveniently consists of a lower and an upper part, the upper part having a device for heating different zones of the interior of the receiver to differently high temperatures. This receiver can be used in such a manner that the molten material in the furnace is emptied into the highly heated part and treated at least partly in the parts heated less, for instance by blowing in hollow forms, the resulting semi-manufactured products being finally formed outside the heated space. The chambers in the two principal parts of the melting plant, namely the melting drum and the receiver, can be constructed according to particular conditions of manufacture, it being naturally supposed that the principle is observed that, subsequently to having been melted in continuous rotation, the entire content of the furnace is transferred quickly, without any cooling, into the receiver in which it is to be formed.

To accelerate the evacuation of the drum, it may be expedient to tip the drum to an approximately vertical position. The position of the drum in the process of evacuation is subject to economical considerations. If the heating temperature is increased sufficiently, any fusible material can be given such a liquid state as to be removable from the interior of the drum simply by gravity and so quickly that no detrimental cooling can take place.

The material molten in the plant can be fashioned economically to technical objects, for instance crucibles, hollow bodies of various descriptions, rods, as well as to any kinds of fused, rolled and flat articles. These latter articles can be produced very advantageously by transferring the highly heated material from the lower part of the receiver direct into casting or welding devices. The molten material is of uniform quality and, on account of its high temperature, can be treated more easily than that produced according to the methods known so far.

The accompanying drawing illustrates a constructional example of the invention in part-sectional elevation.

1 is a steel-armoured drum the interior wall of which is lined with fire-proof material 2. The drum 1 is so mounted in a sleeve 4 as to be rotatable about its axis on two ball bearings 3. To the sleeve 4 are fixed trunnions 5 mounted in stands 6 in such a manner that the sleeve 4 is rotatable about an axis at right angles to the longitudinal axis of the drum 1. The sleeve 4 is provided with an electro-motor 7, and the drum 1 has a ring of teeth 8 connected to the electro-motor 7 by means of an intermediate gear 9. The one end of the drum 1 is covered with a plate 10 in which a burner 11 for a mixture of oxygen and suitable gaseous combustibles is so disposed that the flame 12 is directed into the drum centrally and axially. The other end of the drum 1 is connected to a tube 13 lined with fireproof material. 14 and 15 are the lower and the upper part, respectively, of a receiver. In the upper part 15, which is interchangeable, is provided a tube 16 for the introduction of a heating flame and a tube 17 for the exit of the waste gases.

The material to be melted, for instance quartz sand, is charged into the drum aperture provided with the waste-gas tube 13, and the drum 1 is rotated very quickly by means of the electro-motor 7. This rotation entails that a uniformly thick layer of quartz sand spreads on the interior surface of the drum 1. Subsequently thereto, the flame 12 is introduced into the drum 1, and fine dust is added to the gases ejected by the burner 11, this fine dust increasing the heat radiation of the flame 12. This radiation of heat causes the quartz sand to melt, and the quick rotation of the drum 1 effects that the molten layers are under a high centrifugal pressure and that the evaporation is counteracted considerably. As soon as the molten material is sufficiently soft, the plate 10 and burner 11 are removed, the speed of the electro-motor is lowered, and the drum 1 is tipped into the position 1' indicated in the drawing by dash-lines. When the drum 1 assumes this tipped position, the drum aperture from which the burner 11 is removed connects to the upper part 15 of the receiver, which had been heated to a corresponding high temperature. The content of the drum evacuates into the receiver, the heating of which is being continued. In this receiver, whose upper part 15 may be divided into two differently heated zones by means of suitable walls, the softened material can be preformed. After having been evacuated completely, the drum 1 is tipped back into its original position, and the plate 10 and burner 11 are again connected to the drum, the plant now being ready for the melting of another charge.

I claim:

A method of melting refractory minerals, the said method comprising supplying the charge into the interior of the drum of a revolving-tube furnace, rotating the drum about the longitudinal drum axis, accelerating the rotation of the drum to such a speed that the supplied charge spreads approximately uniformly on the interior surface of the drum on account of the centrifugal force, heating the charge by a flame directed axially into the interior of the drum in such a manner that whirls are avoided and the transmission of heat from the flame to the charge is effected by radiation only, and adding fine dust to the heating flame.

GEORG ZOTOS.